(12) United States Patent
Ogino et al.

(10) Patent No.: US 9,912,259 B2
(45) Date of Patent: Mar. 6, 2018

(54) THYRISTOR STARTING DEVICE AND CONTROL METHOD THEREFOR

(71) Applicant: TOSHIBA MITSUBISHI-ELECTRIC INDUSTRIAL SYSTEMS CORPORATION, Chuo-ku (JP)

(72) Inventors: Hiroshi Ogino, Chuo-ku (JP); Akinobu Ando, Chuo-ku (JP); Yasuhiko Hosokawa, Chuo-ku (JP); Ryota Okuyama, Chuo-ku (JP)

(73) Assignee: TOSHIBA MITSUBISHI-ELECTRIC INDUSTRIAL SYSTEMS CORPORATION, Chou-ku (JP)

( * ) Notice: Subject to any disclaimer, the term of this patent is extended or adjusted under 35 U.S.C. 154(b) by 0 days.

(21) Appl. No.: 14/765,420

(22) PCT Filed: Feb. 14, 2013

(86) PCT No.: PCT/JP2013/053510
§ 371 (c)(1),
(2) Date: Aug. 3, 2015

(87) PCT Pub. No.: WO2014/125595
PCT Pub. Date: Aug. 21, 2014

(65) Prior Publication Data
US 2015/0365020 A1 Dec. 17, 2015

(51) Int. Cl.
*H02P 27/06* (2006.01)
*F25B 49/02* (2006.01)
(Continued)

(52) U.S. Cl.
CPC .............. *H02P 1/022* (2013.01); *H02M 1/32* (2013.01); *H02M 1/36* (2013.01); *H02M 5/4505* (2013.01);
(Continued)

(58) Field of Classification Search
CPC ..... H02P 27/08; B23K 11/252; F24F 11/0009
(Continued)

(56) References Cited

U.S. PATENT DOCUMENTS 5,796,194 A * 8/1998 Archer ................... H02K 29/12
310/184
2005/0264961 A1 12/2005 Ogawa et al.

FOREIGN PATENT DOCUMENTS

JP          62-262670 A        11/1987
JP          62262670 A    *    11/1987
(Continued)

OTHER PUBLICATIONS

Extended European Search Report issued Aug. 11, 2016 in Patent Application No. 13875275.3.
(Continued)

*Primary Examiner* — Shawki S Ismail
*Assistant Examiner* — Cortez Cook
(74) *Attorney, Agent, or Firm* — Oblon, McClelland, Maier & Neustadt, L.L.P.

(57) ABSTRACT

A thyristor starting device includes: a converter which converts AC power supplied from an AC power source into DC power; a DC reactor which smooths a DC current; an inverter which converts the DC power provided from the converter into AC power, and supplies the AC power to a synchronous machine; a gate pulse generation circuit which generates a gate pulse to be provided to thyristors of the converter and the inverter; a control unit which sets a phase control angle of the gate pulse to be provided to the thyristors of the converter, by controlling a current of the converter such that the DC current flowing into the DC reactor matches a current command value; and an abnormality detection unit which compares a detection value of the DC current with the current command value, and deter-
(Continued)

mines an abnormality in the gate pulse based on a comparison result.

2 Claims, 4 Drawing Sheets

(51) Int. Cl.
  *H02P 1/02* (2006.01)
  *H02M 1/32* (2007.01)
  *H02M 1/36* (2007.01)
  *H02M 5/45* (2006.01)
  *H02M 5/452* (2006.01)
  *H02P 1/52* (2006.01)
(52) U.S. Cl.
  CPC ............... *H02M 5/452* (2013.01); *H02P 1/52* (2013.01); *H02P 2201/13* (2013.01)
(58) Field of Classification Search
  USPC .......................... 219/110; 290/40 B; 318/802
  See application file for complete search history.

(56) References Cited

FOREIGN PATENT DOCUMENTS

| | | |
|---|---|---|
| JP | 02-65668 A | 3/1990 |
| JP | 06-19012 U | 3/1994 |
| JP | 07-288980 A | 10/1995 |
| JP | 11-285256 A | 10/1999 |
| JP | 2005-341671 A | 12/2005 |
| JP | 2012-200109 A | 10/2012 |
| JP | 2012200109 A * | 10/2012 |

OTHER PUBLICATIONS

Japanese Office Action issued Sep. 20, 2016 in Patent Application No. 2015-500042 (with English language translation).
International Search Report dated May 14, 2013 in PCT/JP2013/053510 filed Feb. 14, 2013.

* cited by examiner

US 9,912,259 B2

THYRISTOR STARTING DEVICE AND CONTROL METHOD THEREFOR

TECHNICAL FIELD

The present invention relates to a thyristor starting device, and more particularly to a technique for detecting a gate pulse abnormality caused in a thyristor starting device.

BACKGROUND ART

A thyristor starting device includes a converter which converts three-phase alternating current (AC) power into direct current (DC) power, a DC reactor which smooths a DC current, and an inverter which converts the DC power provided from the converter through the DC reactor into three-phase AC power having a desired frequency, and provides the three-phase AC power to a synchronous machine. As disclosed for example in Japanese Patent Laying-Open No. 62-262670 (PTD 1), the thyristor starting device includes an AC current detector which detects a three-phase AC current to be input to the converter, an AC voltage detector which detects a three-phase AC voltage output from the inverter, and a control circuit which controls the converter and the inverter based on detection results of the AC current detector and the AC voltage detector. By controlling the three-phase AC power to be provided to the synchronous machine, the synchronous machine in a stopped state can be started and rotationally driven at a prescribed rotation speed.

CITATION LIST

Patent Document

PTD 1: Japanese Patent Laying-Open No. 62-262670

SUMMARY OF INVENTION

Technical Problem

In such a thyristor starting device, the control circuit generates a gate pulse to be provided to gates of a plurality of thyristors included in the converter and the inverter. Desired power conversion operation is performed in the converter and the inverter, by turning on the plurality of thyristors at prescribed timing in response to the gate pulse. Therefore, when an abnormality occurs in the gate pulse, the thyristors are not switched normally, and thus an abnormal current may flow into the converter and the inverter and damage them. In order to prevent such a defect, it is necessary to monitor the gate pulse output from a gate pulse generation circuit and detect its abnormality immediately.

On the other hand, providing a dedicated monitoring circuit within the thyristor starting device to detect an abnormality in the gate pulse leads to increases in the size and cost of the device. Further, providing a determination circuit for determining an abnormality in the gate pulse poses a problem that the control circuit has a complicated configuration.

Accordingly, a main object of the present invention is to provide a thyristor starting device capable of detecting an abnormality in the gate pulse with a small-sized and simple configuration, and a control method therefor.

Solution to Problem

According to an aspect of the present invention, a thyristor starting device includes: a converter which converts AC power supplied from an AC power source into DC power; a DC reactor which smooths a DC current; an inverter which converts the DC power provided from the converter through the DC reactor into AC power, and supplies the AC power to a synchronous machine; a gate pulse generation circuit which generates a gate pulse to be provided to thyristors of the converter and the inverter; a control unit which sets a phase control angle of the gate pulse to be provided to the thyristors of the converter, by controlling a current of the converter such that the DC current flowing into the DC reactor matches a current command value; and an abnormality detection unit which compares a detection value of the DC current with the current command value, and determines an abnormality in the gate pulse based on a comparison result.

According to another aspect of the present invention, provided is a control method for a thyristor starting device, the thyristor starting device including a converter which converts AC power supplied from an AC power source into DC power, a DC reactor which smooths a DC current, an inverter which converts the DC power provided from the converter through the DC reactor into AC power, and supplies the AC power to a synchronous machine, and a gate pulse generation circuit which generates a gate pulse to be provided to thyristors of the converter and the inverter. The control method for the thyristor starting device includes the steps of: setting a phase control angle of the gate pulse to be provided to the thyristors of the converter, by controlling a current of the converter such that the DC current flowing into the DC reactor matches a current command value; and comparing a detection value of the DC current with the current command value, and determining an abnormality in the gate pulse based on a comparison result.

Advantageous Effects of Invention

The thyristor starting device in accordance with the present invention can detect an abnormality in the gate pulse with a small-sized and simple configuration.

DESCRIPTION OF EMBODIMENTS

Figure 1:
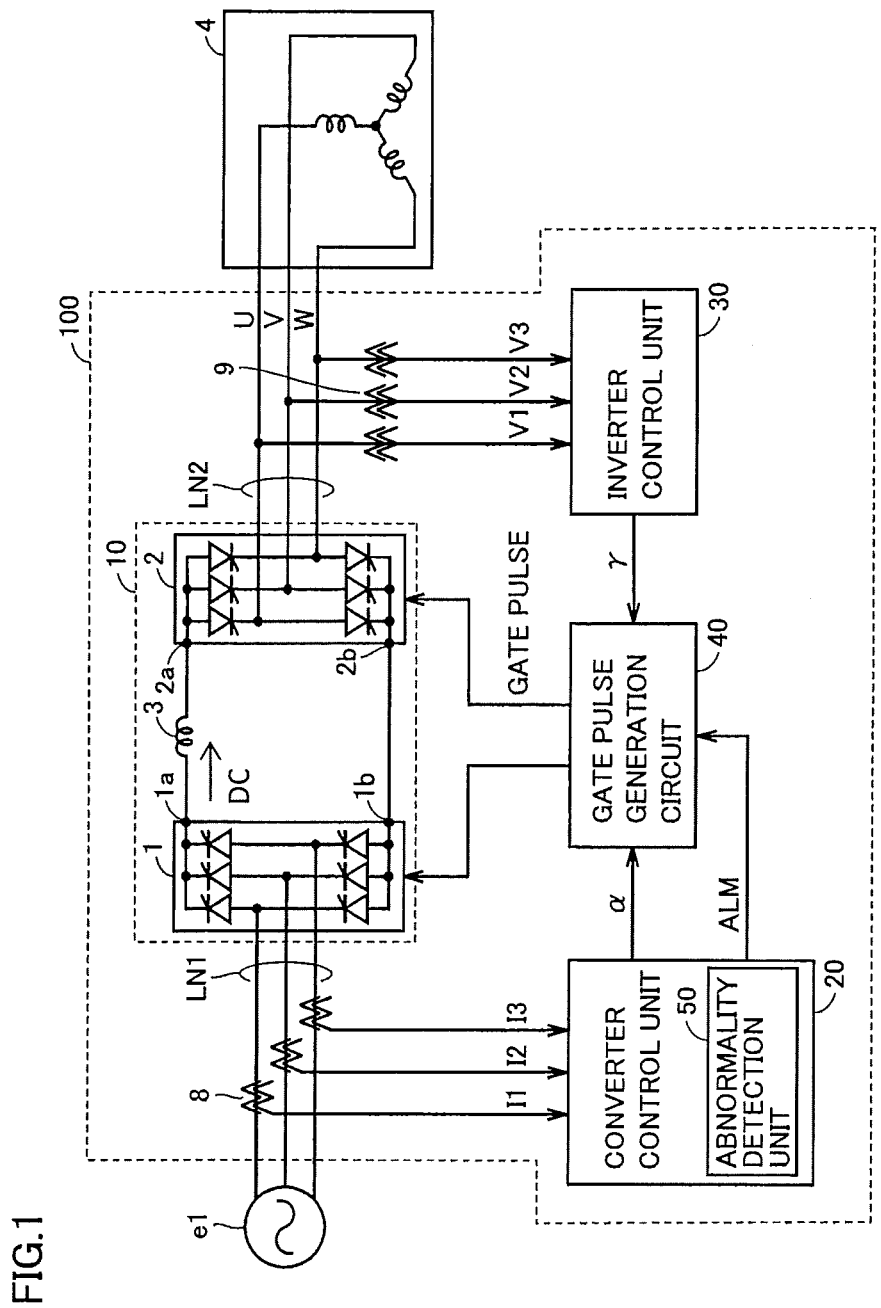
FIG. 1 is a view showing a configuration of a thyristor starting device in accordance with an embodiment of the present invention.

Hereinafter, an embodiment of the present invention will be described with reference to the drawings. It is noted that identical or corresponding parts in the drawings will be designated by the same reference numerals, and the description thereof will not be repeated.

FIG. 1 is a view showing a configuration of a thyristor starting device in accordance with an embodiment of the present invention.

Referring to FIG. 1, a thyristor starting device 100 receives three-phase AC power from an AC power source e1, and starts a synchronous machine 4. Thyristor starting device 100 includes a power conversion unit 10, an AC current detector 8, an AC voltage detector 9, a converter control unit 20, an inverter control unit 30, and a gate pulse generation circuit 40. Thyristor starting device 100 further includes AC current detector 8 and AC voltage detector 9.

Power conversion unit 10 receives the three-phase AC power from AC power source e1 through a three-phase line LN1. AC current detector 8 detects a three-phase AC current to be supplied to power conversion unit 10, and outputs current detection values I1, I2, I3 to converter control unit 20.

Power conversion unit 10 includes a converter 1, an inverter 2, and a DC reactor 3. Converter 1 converts the three-phase AC power from AC power source e1 into DC power. Converter 1 is a three-phase full wave rectifying circuit including at least six thyristors. Each thyristor receives, at its gate, a gate pulse from converter control unit 20. The three-phase AC power can be converted into the DC power by turning on the six thyristors at prescribed timing.

DC reactor 3 is connected between a high voltage-side output terminal 1a of converter 1 and a high voltage-side input terminal 2a of inverter 2 to smooth a DC current shown in FIG. 1 as DC. A low voltage-side output terminal 1b of converter 1 is directly connected to a low voltage-side input terminal 2b of inverter 2.

Inverter 2 converts the DC power provided from converter 1 through DC reactor 3 into three-phase AC power having a desired frequency. Inverter 2 includes at least six thyristors. Each thyristor receives, at its gate, a gate pulse from inverter control unit 30. The DC power can be converted into the three-phase AC power having a desired frequency by turning on the six thyristors at prescribed timing.

The three-phase AC power generated by inverter 2 is provided to synchronous machine 4 through a three-phase line LN2. When synchronous machine 4 has two poles, the rotation speed during a normal operation is 3000 rpm to 3600 rpm.

Synchronous machine 4 includes three-phase coils. The three-phase coils are each connected to three-phase line LN2. When the three-phase AC power is supplied to the three-phase coils, a rotating magnetic field is generated and synchronous machine 4 rotates.

AC voltage detector 9 detects a three-phase AC voltage to be supplied to the three phase coils of synchronous machine 4, and outputs voltage detection values V1, V2, V3 to inverter control unit 30.

Converter control unit 20 controls converter 1, based on current detection values I1, I2, I3 received from AC current detector 8. Specifically, converter control unit 20 controls a current of converter 1 such that the DC current to be output from converter 1 matches a prescribed current command value Id*. Using a method described later, converter control unit 20 calculates a phase control angle (firing angle) α based on current detection values I1, I2, I3, and outputs calculated phase control angle α to gate pulse generation circuit 40. Gate pulse generation circuit 40 generates the gate pulse to be provided to the gates of the thyristors of converter 1, based on phase control angle α received from converter control unit 20.

Inverter control unit 30 controls inverter 2, based on voltage detection values V1, V2, V3 received from AC voltage detector 9. Inverter control unit 30 includes a rotor position detection unit not shown. The rotor position detection unit detects a rotation position of a rotor of synchronous machine 4, based on voltage detection values V1, V2, V3 received from AC voltage detector 9. Inverter control unit 30 calculates a phase control angle (firing angle) γ based on the detected rotation position of the rotor, and outputs calculated phase control angle γ to gate pulse generation circuit 40. Gate pulse generation circuit 40 generates the gate pulse to be provided to the gates of the thyristors of inverter 2, based on phase control angle γ received from inverter control unit 30.

Such a thyristor starting device is used, for example in a power plant, to start a synchronous generator in a stopped state, as a synchronous motor. With the synchronous generator being rotationally driven as the synchronous motor at a prescribed rotation speed, the thyristor starting device is separated from the synchronous generator, and the synchronous generator is rotationally driven by a gas turbine or the like to generate AC power.

Converter control unit 20 includes an abnormality detection unit 50. Abnormality detection unit 50 detects an abnormality in the gate pulse to be provided from gate pulse generation circuit 40 to converter 1 and inverter 2. When abnormality detection unit 50 detects an abnormality in the gate pulse, abnormality detection unit 50 stops operation of converter 1, and outputs an alarm signal ALM to inverter control unit 30. Upon receiving abnormality detection signal ALM, inverter control unit 30 stops operation of inverter 2.

Figure 2:
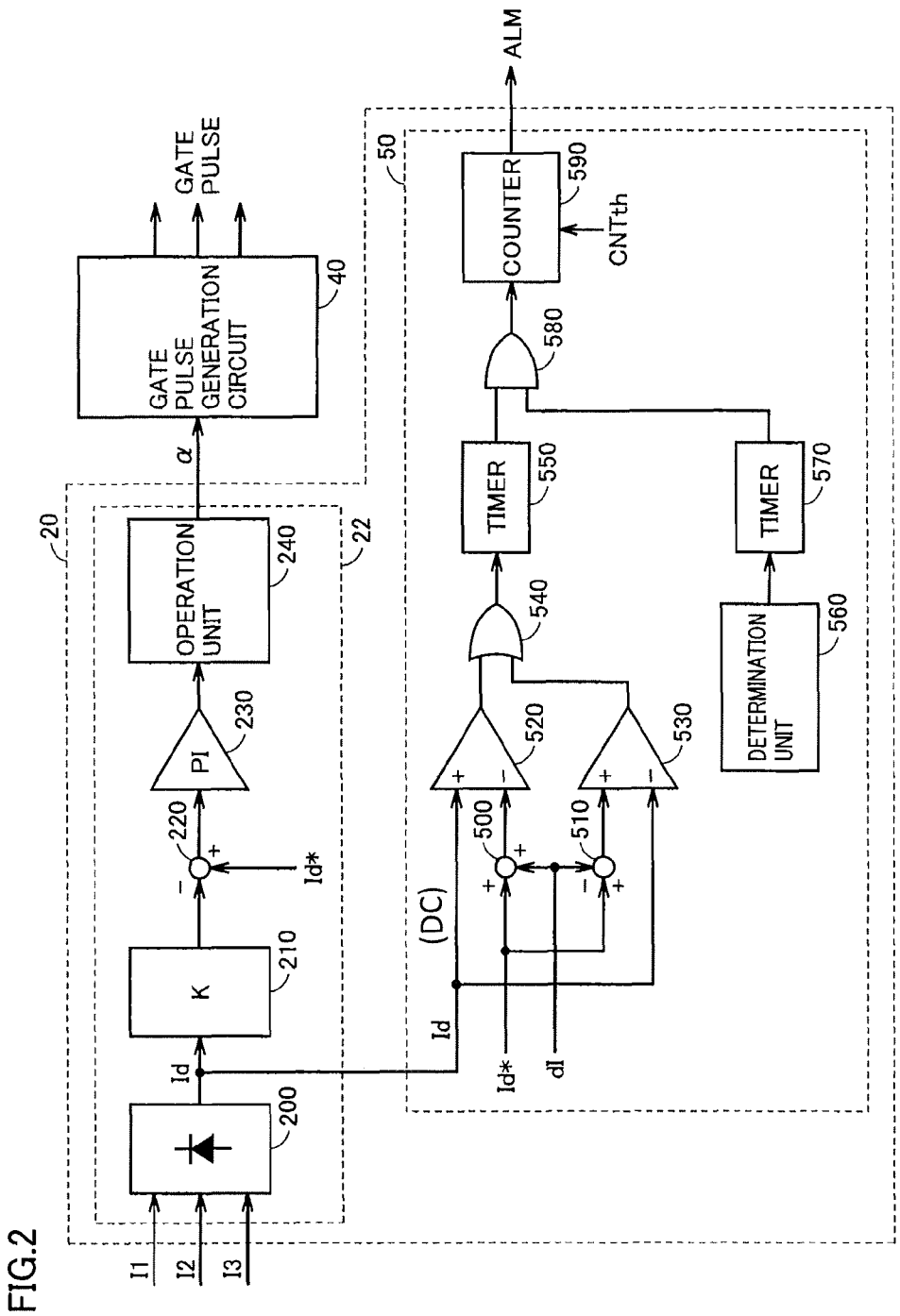
FIG. 2 is a block diagram showing a control structure of a converter control unit in FIG. 1.

FIG. 2 is a block diagram showing a control structure of converter control unit 20 in FIG. 1.

Referring to FIG. 2, converter control unit 20 includes a current control unit 22 for controlling a current of converter 1, and abnormality detection unit 50. Current control unit 22 includes a rectification circuit 200, a gain multiplication units 210, a subtraction unit 220, a PI operation unit 230, and an operation unit 240.

Rectification circuit 200 receives current detection values I1, I2, I3 from AC current detector 8. Rectification circuit 200 uses a full wave rectifying-type diode rectifier, and converts current detection values I1, I2, I3 into a DC current Id.

Gain multiplication unit 210 multiplies DC current Id from rectification circuit 200 by a gain K, and outputs the result to subtraction unit 220. The value obtained by multiplying DC current Id by gain K is proportional to the DC current flowing into DC reactor 3.

Subtraction unit 220 calculates a current deviation ΔId between current command value Id* and a DC current K·Id, and outputs calculated current deviation ΔId to PI operation unit 230. Current command value Id* is a target value of the DC current, and is a control command set in accordance with the operation state of synchronous machine 4. PI operation unit 230 generates a PI output in accordance with current deviation ΔId, according to prescribed proportional gain and integral gain.

Specifically, PI operation unit 230 includes a proportional element (P), an integral element (I), and an addition unit. The proportional element multiplies current deviation ΔId by the prescribed proportional gain, and outputs the result to the addition unit. The integral element integrates current deviation ΔId with the prescribed integral gain, and outputs the result to the addition unit. The addition unit adds the outputs from the proportional element and the integral element to generate the PI output. This P1 output is equivalent to a control command which defines a voltage value of the DC power to be output by converter 1.

Operation unit 240 calculates phase control angle α using the PI output provided from PI operation unit 230. Here, if an overlap angle is ignored, an average value $E_{d\alpha}$ of a DC voltage to be output from converter 1 is provided by the following equation (1):

$$E_{d\alpha} = 1.35 E_s \cos \alpha \quad (1),$$

where $E_s$ is an effective value of a line voltage of AC power source e1.

Operation unit 240 calculates phase control angle α by assigning the PI output provided from PI operation unit 230 to $E_{d\alpha}$ of this equation (1). Operation unit 240 outputs calculated phase control angle α to gate pulse generation circuit 40.

Gate pulse generation circuit 40 generates the gate pulse to be provided to each thyristor of converter 1, based on phase control angle α. By switching-controlling converter 1 according to the gate pulse generated by gate pulse generation circuit 40, a DC current according to current command value Id* is output from converter 1. In this manner, in current control unit 22, a feedback control system for matching the DC current to current command value Id* is configured.

Here, when an abnormality occurs in the gate pulse to be output from gate pulse generation circuit 40 to converter 1 and inverter 2, switching in converter 1 and inverter 2 is not performed normally. For example, when there occurs a gate pulse abnormality in which a thyristor of a specific phase of inverter 2 is fixed to a conductive state, a current continues to flow into the specific phase and thereby may cause overheating. Therefore, when inverter control unit 30 receives alarm signal ALM from abnormality detection unit 50, inverter control unit 30 forcibly stops the operation of inverter 2 by turning off each thyristor of inverter 2. On this occasion, converter control unit 20 also forcibly stops the operation of converter 1 by turning off each thyristor of converter 1.

Abnormality detection unit 50 determines an abnormality in the gate pulse by monitoring a feedback current for current control in the above feedback control system in current control unit 20. Specifically, the three-phase AC current detected by AC current detector 8 is converted into DC current Id by rectification circuit 200, and thereafter is provided to abnormality detection unit 50 as the feedback current. When an abnormality occurs in switching in converter 1 or inverter 2, a detection value of DC current Id as the feedback current considerably varies, deviating from current command value Id*. Abnormality detection unit 50 compares the detection value of DC current Id provided from current control unit 22 with current command value Id*, and determines an abnormality in the gate pulse based on a comparison result thereof.

Abnormality detection unit 50 includes an addition unit 500, a subtraction unit 510, comparators 520 and 530, an OR circuit 540, and a timer 550. Abnormality detection unit 50 further includes a determination unit 560, a timer 570, an AND circuit 580, and a counter 590.

Abnormality detection unit 50 sets an acceptable range of feedback current Id using addition unit 500 and subtraction unit 510. The acceptable range of feedback current Id is set to have an acceptable width dI on each of a high-current side and a low-current side relative to current command value Id*. Specifically, addition unit 500 adds current command value Id* and acceptable width dI to set an upper limit value of the acceptable range (acceptable upper limit value). Subtraction unit 510 subtracts acceptable width dI from current command value Id* to set a lower limit value of the acceptable range (acceptable lower limit value). When the gate pulse is normal, current control of converter 1 is performed such that feedback current Id is maintained between the acceptable upper limit value (=Id*+dI) and the acceptable lower limit value (=Id*−dI).

Comparator 520 compares DC current (feedback current) Id provided from rectification circuit 200 with the acceptable upper limit value, and outputs a signal indicating a comparison result. When DC current Id exceeds the acceptable upper limit value, comparator 520 outputs a signal at an H (logical high) level.

Comparator 530 compares DC current (feedback current) Id provided from rectification circuit 200 with the acceptable lower limit value, and outputs a signal indicating a comparison result. When DC current Id is less than the acceptable lower limit value, comparator 530 outputs a signal at an H level.

OR circuit 540 outputs a logical addition of the output signal of comparator 520 and the output signal of comparator 530 to timer 550. Namely, when DC current Id exceeds the acceptable upper limit value, or when DC current Id is less than the acceptable lower limit value, a signal at an H level is output from OR circuit 540.

Timer 550 measures a time for which the output signal of OR circuit 540 is at an H level. A count value of timer 550 is reset when the output signal of OR circuit 540 is switched from an H level to an L level. When the measured time reaches a prescribed time, timer 550 outputs the signal at an H level received from OR circuit 540 to AND circuit 580.

Abnormality determination in abnormality detection unit 50 will be described in detail using FIG. 3.

Figure 3:
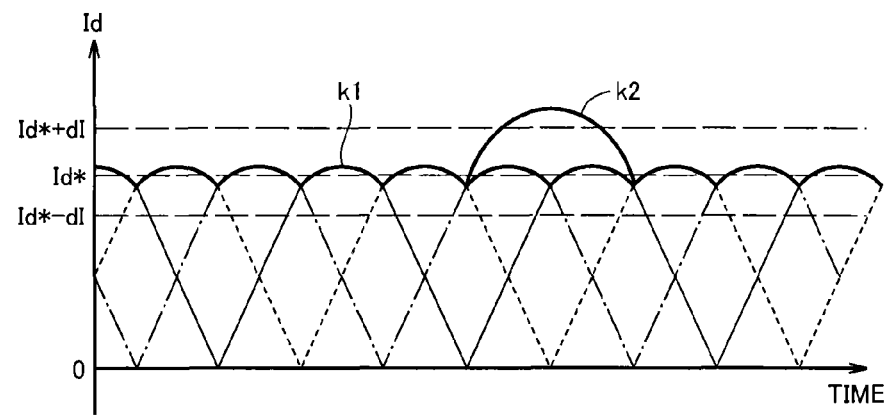
FIG. 3 is a view illustrating abnormality determination in an abnormality detection unit.

Referring to FIG. 3, for DC current Id provided from rectification circuit 200 of current control unit 22, acceptable upper limit value Id*+dI and acceptable lower limit value Id*−dI are set as described above. When the gate pulse is normal, DC current Id falls within a range between the acceptable upper limit value and the acceptable lower limit value, as indicated by k1 in the drawing.

In contrast, when an abnormality occurs in the gate pulse, there occurs a phenomenon in which DC current Id exceeds the acceptable upper limit value, as indicated by k2 in the drawing, or there occurs a phenomenon in which DC current Id is less than the acceptable lower limit value. Abnormality detection unit 50 monitors DC current Id, and upon detecting these phenomena, abnormality detection unit 50 determines that the gate pulse is abnormal.

However, when DC current Id deviates from the acceptable range due to an accidental factor, for example when the current detection value of AC current detector 8 temporarily varies due to the influence of noise or the like, there is a possibility that the gate pulse may be erroneously determined as abnormal. Therefore, abnormality detection unit 50 uses timer 550 to measure the time for which DC current Id deviates from the acceptable range, and when the measured time reaches the prescribed time, abnormality detection unit 50 determines that the gate pulse is abnormal.

Figure 4:
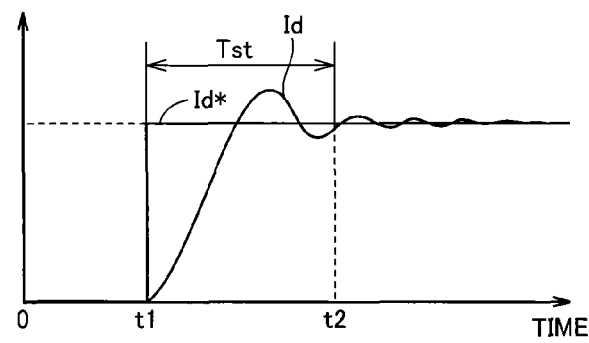
FIG. 4 is a view illustrating a waveform of a DC current when energization of the thyristor starting device is started.

Further, when current command value Id* changes suddenly from zero as shown in FIG. 4, it is not possible to secure control responsiveness enough to respond to the sudden change, and an overshoot occurs in DC current Id. In order to prevent such an overshoot in DC current Id from being erroneously determined as an abnormality in the gate pulse, abnormality detection unit 50 invalidates abnormality determination for a fixed time after energization is started (equivalent to time Tst in the drawing), using determination unit 560 and timer 570.

Specifically, referring back to FIG. 2, determination unit 560 determines whether or not a start command for thyristor starting device 100 has been provided from a central control unit not shown. This is because, when the energization of thyristor starting device 100 is started, DC command value Id* generally changes suddenly from zero. It is noted that, when thyristor starting device 100 receives the start command, thyristor starting device 100 accelerates rotation of synchronous machine 4 by supplying AC power to synchronous machine 4 based on the AC power supplied from AC power source e1.

Timer 570 measures a time that has elapsed since reception of the start command for thyristor starting device 100. When the measured time reaches fixed time Tst in FIG. 3, timer 570 outputs a signal activated to an H level to AND circuit 580.

With such a configuration, AND circuit 580 is validated after the lapse of fixed time Tst since the start of the energization of thyristor starting device 100, and, when it is determined that the gate pulse is abnormal, AND circuit 580 outputs a signal at an H level.

Counter 590 is used to measure the number of times it has been determined that the gate pulse is abnormal. When it is determined, by the abnormality determination described above, that the gate pulse is abnormal, 1 is added to a count value. Counter 590 determines whether or not the count value has reached a determination value CNTth, and when the count value reaches determination value CNTth, counter 590 finalizes the determination that the gate pulse is abnormal, and outputs alarm signal ALM.

In this manner, when the number of times it has been determined that the gate pulse is abnormal reaches determination value CNTth, abnormality detection unit 50 finalizes a determination result that the gate pulse is abnormal. This can prevent making an erroneous determination that the gate pulse is abnormal based on an accidental factor. As a result, highly reliable abnormality detection can be performed.

It is noted that, although the present embodiment has described the configuration in which the determination result that the gate pulse is abnormal is finalized when the number of times it has been determined that the gate pulse is abnormal reaches determination value CNTth, there may be adopted a configuration in which the determination result that the gate pulse is abnormal is finalized only after it has been continuously determined that the gate pulse is abnormal.

Figure 5:
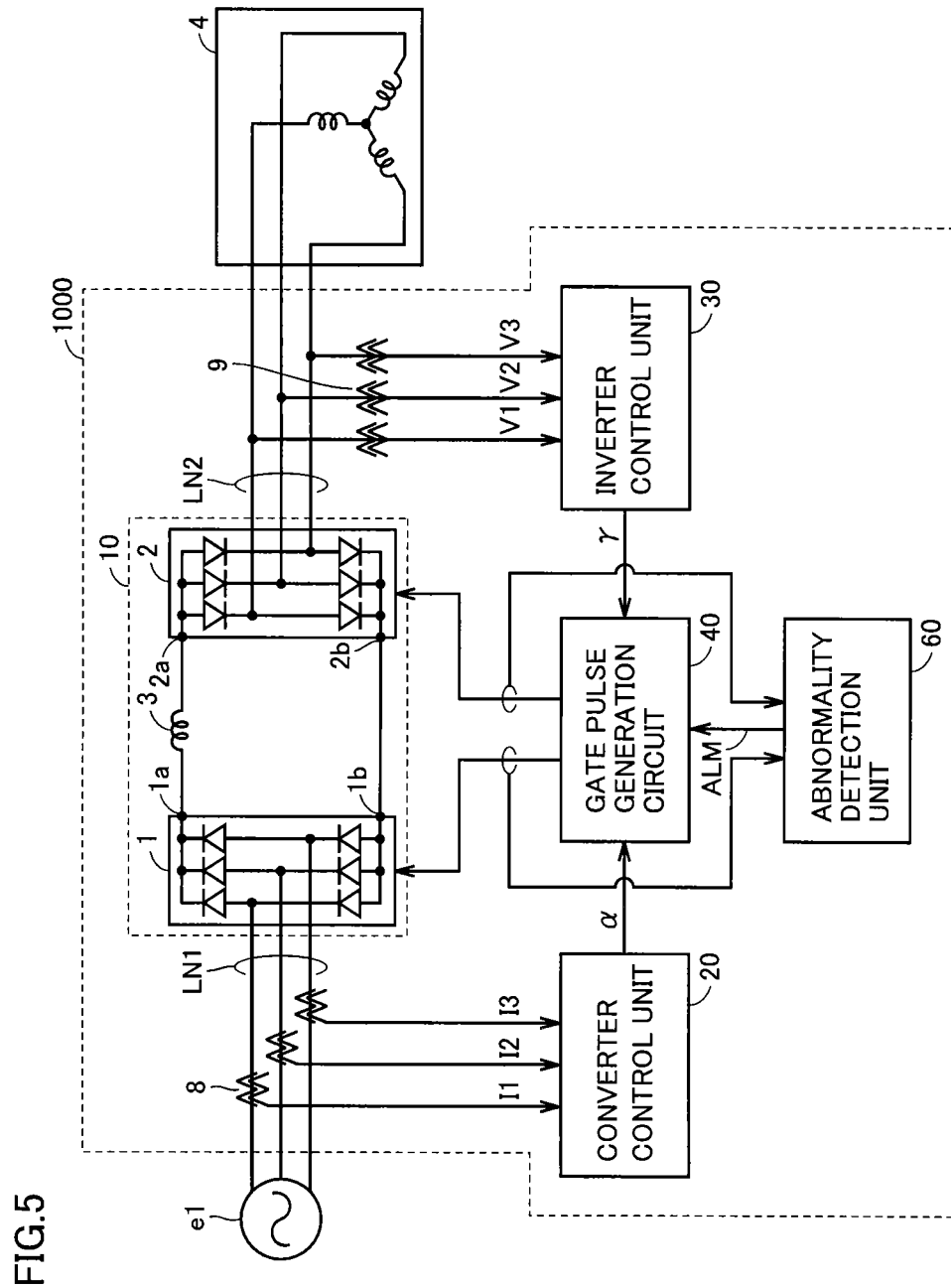
FIG. 5 is a view showing a configuration of a thyristor starting device in a comparative example.

As has been described above, the thyristor starting device in accordance with the present embodiment is configured such that an abnormality in the gate pulse is determined based on the feedback current used for the current control of converter 1. Thus, there is no need to provide a circuit for monitoring the gate pulse itself (equivalent to an abnormality detection unit 60) within a thyristor starting device 1000, as shown in FIG. 5. Thereby, a small-sized and low-cost thyristor starting device can be achieved.

Further, since an abnormality in the gate pulse can be determined based on a result of comparison between the feedback current and the current command value, an abnormality in the gate pulse can be determined with a simpler configuration, as compared to abnormality detection unit 60 which monitors the gate pulse itself.

It should be understood that the embodiment disclosed herein is entirely illustrative and non-restrictive. Application of the present invention is defined by the scope of the claims, rather than the description above, and is intended to include any modifications within the scope and meaning equivalent to the scope of the claims.

REFERENCE SIGNS LIST

1: converter; 2: inverter; 3: DC reactor; 4: synchronous machine; 8: AC current detector; 9: AC voltage detector; 10: power conversion unit; 20: converter control unit; 22: current control unit; 30: inverter control unit; 40: gate pulse generation circuit; 50, 60: abnormality detection unit; 100, 1000: thyristor starting device; 200: rectification circuit; 210: gain computation unit; 220, 510: subtraction unit; 230: PI operation unit; 240: operation unit; 500: addition unit; 520, 530: comparator; 540: OR circuit; 550, 570: timer; 560: determination unit; 580: AND circuit; 590: counter; DC: DC current; e1: AC power source.

The invention claimed is:

1. A thyristor starting device, comprising:
   a converter which converts AC power supplied from an AC power source into first DC power;
   a DC reactor which smooths a first DC current corresponding to the first DC power;
   an inverter which converts the first DC power provided from said converter through said DC reactor into AC power, and supplies the AC power to a synchronous machine;
   a gate pulse generation circuit which generates a gate pulse to be provided to thyristors of said converter and said inverter;
   a control unit which sets a phase control angle of the gate pulse to be provided to the thyristors of said converter, by controlling a current of said converter such that the first DC current flowing into said DC reactor matches a current command value;
   an AC current detector which detects an AC current supplied from said AC power source:
   a rectification circuit which rectifies an output of said AC current detector to produce second DC current;
   and an abnormality detection unit, comprising a first timer and a second timer, which compares a detection value of the second DC current with said current command value, and determines an abnormality in said gate pulse based on a comparison result, wherein said control unit is configured to feedback-control the first DC current based on a deviation between said current command value and the second DC current, said abnormality detection unit compares the second DC current with said current command value, and determines the abnormality in said gate pulse based on a comparison result;
   said abnormality detection unit sets an upper limit value and a lower limit value of an acceptable range on a high-current side and a low-current side, respectively, relative to said current command value, compares the detection value of the second DC current with the upper limit value and the lower limit value, and in response to a determination that the first DC current flowing into said DC reactor deviates from said acceptable range, provide a signal to a first timer;
   the first timer is configured to measure a first time for which the signal is received and to be reset when the signal stops, the second timer is configured to measure a second time that has elapsed since reception of a start command for the thyristor starting device;
   and the abnormality detection circuit is configured to determine that the gate pulse is abnormal when the measured first time reaches a prescribed time and the measured second time exceeds a fixed time.

2. A control method for a thyristor starting device, said thyristor starting device including:
   a converter which converts AC power supplied from an AC power source into first DC power,
   a DC reactor which smooths a first DC current corresponding to the first DC power,
   an inverter which converts the first DC power provided from said converter through said DC reactor into AC power, and supplies the AC power to a synchronous machine, a gate pulse generation circuit which generates a gate pulse to be provided to thyristors of said converter and said inverter, an AC current detector which detects an AC current supplied from said AC power source, and a rectification circuit which rectifies an output of said AC current detector to produce a second DC current, said control method comprising the steps of:

setting a phase control angle of the gate pulse to be provided to the thyristors of said converter, by controlling a current of said converter such that the first DC current flowing into said DC reactor matches a current command value;

setting an upper limit value and a lower limit value of an acceptable range on a high-current side and a low-current side, respectively, relative to said current command value;

comparing a detection value of the second DC current with said upper limit value and said lower limit value, and in response to a determination that the first DC current flowing into the DC reactor deviates from the acceptable range, providing a signal to a first timer:

measuring, using the first timer, a first time for which the signal is received by the first timer and resetting the first timer when the signal stops;

measuring, using a second timer, a second time that has elapsed since reception of a start command for the thyristor starting device;

determining an abnormality in the gate pulse when the measured first time reaches a prescribed time and the measured second time exceeds a fixed time, and feedback-controlling the first DC current based on a deviation between said current command value and the second DC current.

* * * * *